(12) United States Patent
Keohane et al.

(10) Patent No.: US 8,607,071 B2
(45) Date of Patent: Dec. 10, 2013

(54) PREVENTING REPLAY ATTACKS IN ENCRYPTED FILE SYSTEMS

(75) Inventors: Susann Marie Keohane, Austin, TX (US); Gerald Francis McBrearty, Austin, TX (US); Jessica Carol Murillo, Round Rock, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 12/034,350

(22) Filed: Feb. 20, 2008

(65) Prior Publication Data

US 2009/0208002 A1 Aug. 20, 2009

(51) Int. Cl.
*G06F 21/00* (2013.01)

(52) U.S. Cl.
USPC .......................................................... 713/193

(58) Field of Classification Search
USPC ................................................ 713/189–194
See application file for complete search history.

(56) References Cited

U.S. PATENT DOCUMENTS

| 5,249,230 A | 9/1993 | Mihm, Jr. |
| 5,276,901 A | 1/1994 | Howell et al. |
| 5,414,852 A | 5/1995 | Kramer et al. |
| 5,708,709 A | 1/1998 | Rose |
| 5,765,153 A | 6/1998 | Benantar et al. |
| 6,249,866 B1 * | 6/2001 | Brundrett et al. ............. 713/165 |
| 2003/0188179 A1 * | 10/2003 | Challener et al. ............. 713/193 |
| 2004/0158711 A1 | 8/2004 | Zimmer |
| 2006/0230266 A1 * | 10/2006 | Maes ............................ 713/168 |

OTHER PUBLICATIONS

U.S. Appl. No. 11/530,022, filed Sep. 7, 2006, Goodman et al.
Shieh et al., "Method to automatically lock/encrypt files or directories on a mobile computing system based on domain references," RD n455, Mar. 2002, Article 157, p. 515.

* cited by examiner

*Primary Examiner* — Jeffrey D Popham
(74) *Attorney, Agent, or Firm* — VanLeeuwen & VanLeeuwen; David A. Mims, Jr.

(57) ABSTRACT

Replay attacks in an encrypted file system are prevented by generating a session key and providing the session key to one or more drive managers and an encrypted file system process. When a drive request is received by the encrypted file system process the drive request is encrypted using the generated session key. The encrypted drive request is sent to a drive manager. The drive manager attempts to decrypt the drive request using the session key. If the encrypted drive request is successfully decrypted, then the drive manager performs the requested operation. On the other hand, if the request is not decrypted successfully, then the request is not performed by the drive manager. Drive managers can include both disk device drivers and a logical volume managers.

16 Claims, 9 Drawing Sheets

US 8,607,071 B2

PREVENTING REPLAY ATTACKS IN ENCRYPTED FILE SYSTEMS

BACKGROUND OF THE INVENTION

1. Technical Field

The present invention relates to a system and method that prevents a replay attack. More particularly, the present invention relates to a system and method that prevents a replay attack in an encrypted file system.

2. Description of the Related Art

Encrypted file systems allows files stored on nonvolatile storage, such as a hard drive, to be encrypted in order to protect confidential and sensitive data and prevent it from being stolen by a malevolent user, such as a hacker. In order to protect data in an encrypted file system, one or more encryption keys are used to encrypt and decrypt the data. In addition, some encrypted file systems use a digital hash to further protect encrypted file blocks. A hash function is executed against the encrypted file blocks resulting in a hash value for each of the blocks. Each hash value serves as a digital "fingerprint" of its corresponding encrypted file block. The encrypted file system executes the hash function when storing data and stores the data hash blocks along with the encrypted file data blocks. If a malevolent user replaces an encrypted file data block, the stored hash value will no longer match the new data in the encrypted file data block, resulting in an error.

For example, assume that a file block of "$25.00" has a corresponding hash value of "ABC123" and a file block of "$100.00" has a corresponding hash value of "XYZ456." If a malevolent user attempts to increase his balance of "$25.00" by writing a "$100.00" to the data block, the hash of the new data block ("$100.00") value would now be "XYZ456" and would no longer match the stored hash value of "ABC123." This would result in an error that would notify the system administrator that someone altered the encrypted file block, and appropriate action could be taken (e.g., disabling the user's account because the balance was improperly altered).

A challenge of using encrypted file systems with data block hashes, however, is that a malevolent user could copy both the encrypted file block and the corresponding hash value to a different location. Then, after the encrypted file block and the corresponding hash value have been altered by legitimate processes, the malevolent user could overwrite the encrypted data block and the data block hash with the copied data. Using the example from above, the user's original account balance is "$100.00" and the stored hash value is "XYZ456." Before using the service tied to the account balance, the malevolent user copies both the encrypted data block and the stored hash value ("$100.00" and "XYZ456") to a separate location. After using the service, assume that the account balance is lowered to "$25.00" with a corresponding hash value of "ABC123." Now, the malevolent user overwrites both the encrypted data block containing the account balance as well as the corresponding hash value with the data previously copied to the separate location ("$100.00" and "XYZ456," respectively). Now, because "XYZ456" is the correct hash value for the encrypted data block containing the $100.00 account balance, an error will not occur when the overwritten encrypted data block is next read. In this manner, the malevolent user can repeatedly replenish the money in his account without ever paying for it.

SUMMARY

It has been discovered that the aforementioned challenges are resolved using a system, method and computer program product that generates a session key and provides the session key to one or more drive managers and an encrypted file system process. When a drive request is received by the encrypted file system process the drive request is encrypted using the generated session key. The encrypted drive request is sent to a drive manager. The drive manager attempts to decrypt the drive request using the session key. If the encrypted drive request is successfully decrypted, then the drive manager performs the requested operation. On the other hand, if the request is not decrypted successfully, then the request is not performed by the drive manager. Drive managers can include both disk device drivers and a logical volume managers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
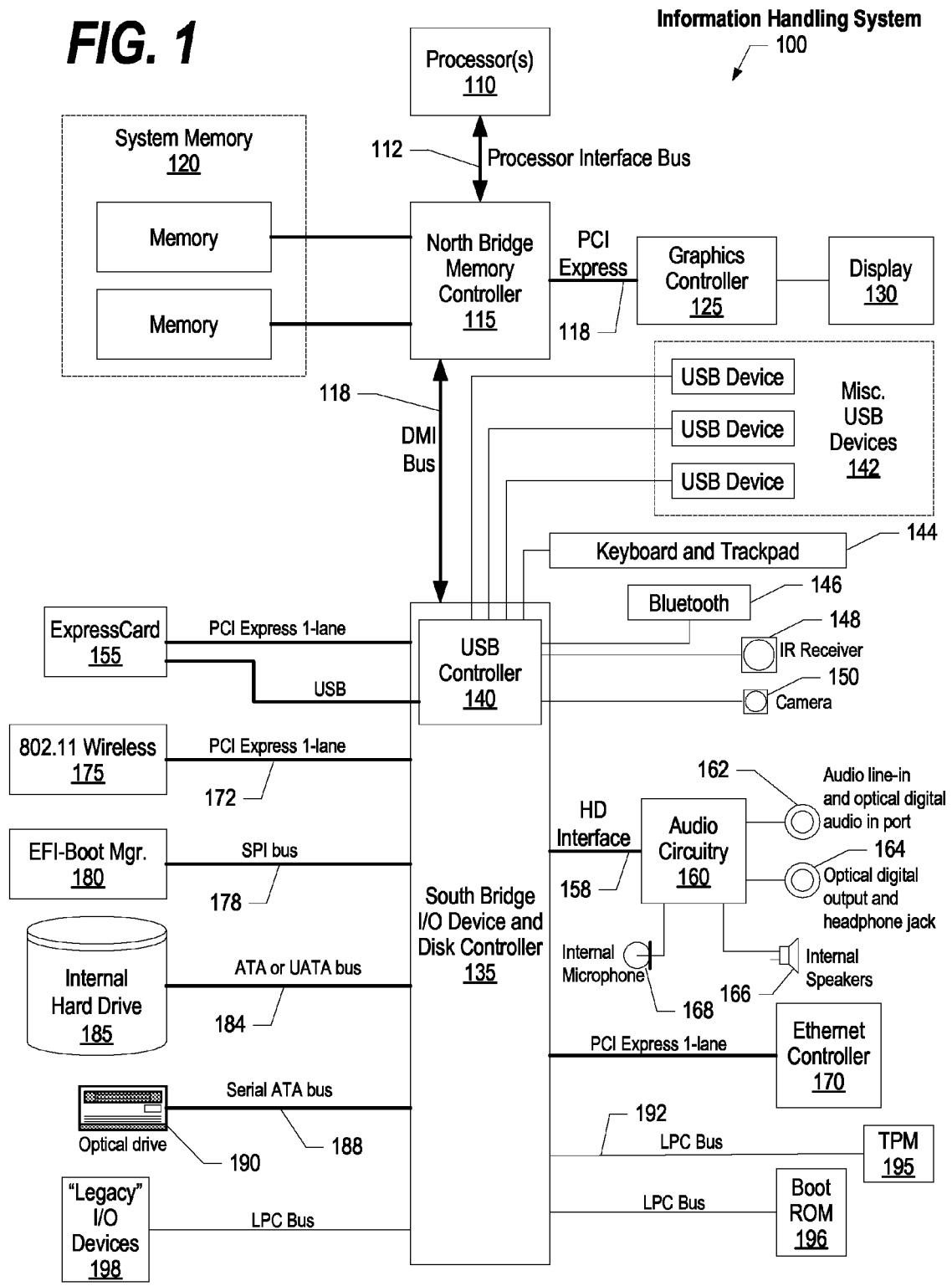
FIG. 1 is a block diagram of a data processing system in which the methods described herein can be implemented.
Figure 2:
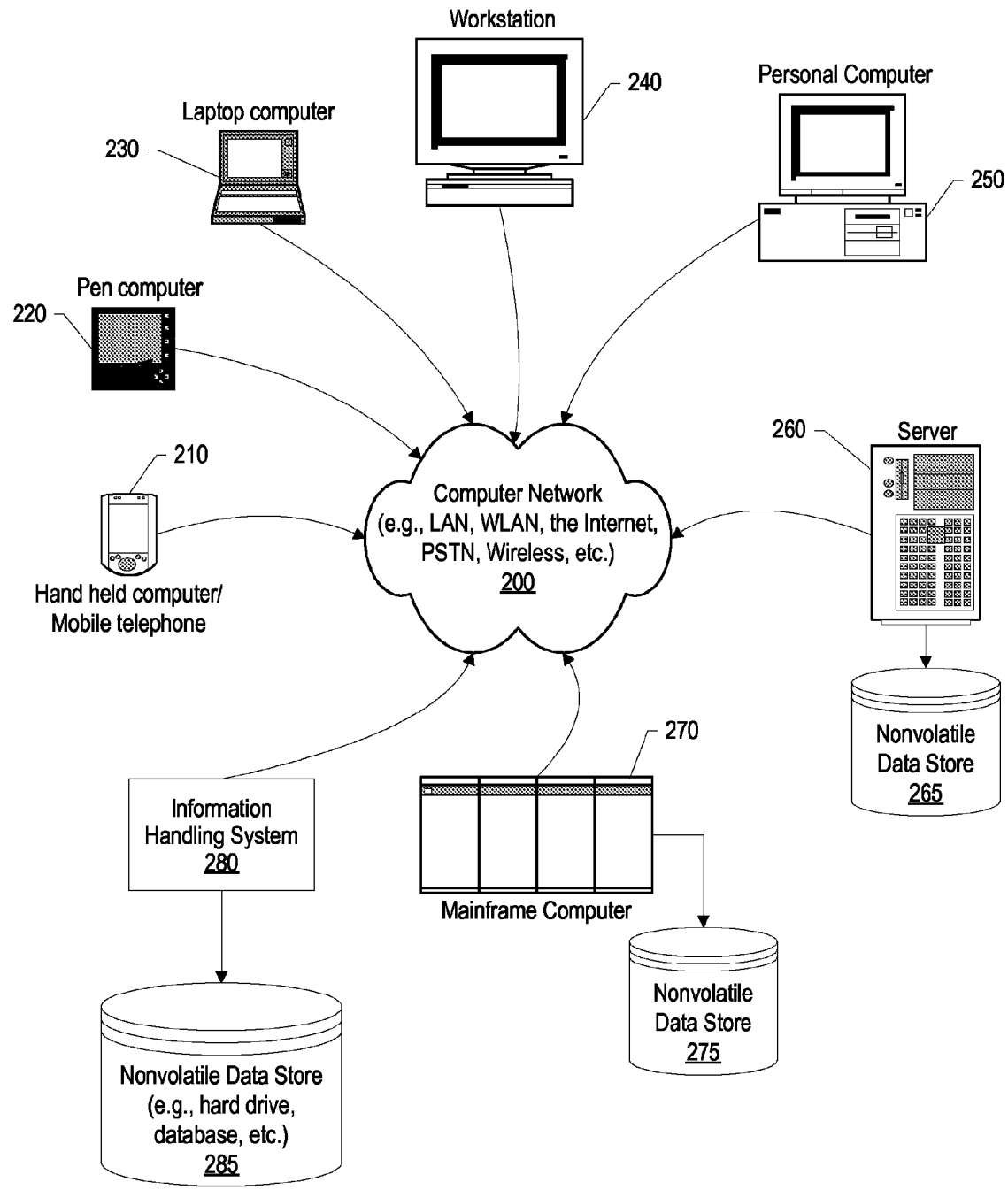
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
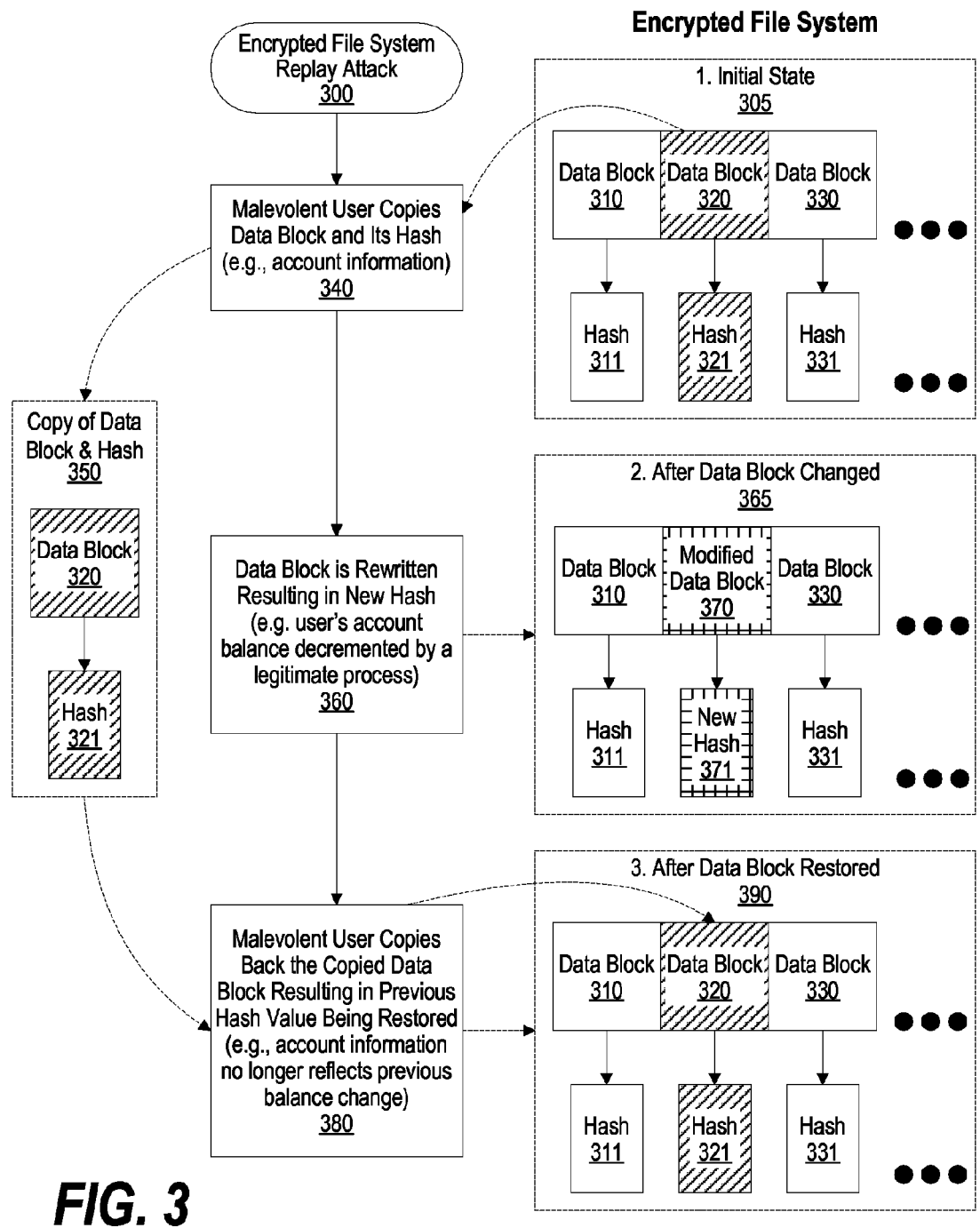
FIG. 3 is a prior art depiction of a replay attack in an encrypted file system.

FIG. 3 is a prior art depiction of a replay attack in an encrypted file system. Prior art replay attack is shown commencing at 300. The initial state of the encrypted file system is shown in initial state depiction 305. In the initial state, three data blocks are shown—data blocks 310, 320, and 330. Because these blocks are in an encrypted file system, each block has a corresponding hash value—hash values 311, 321, and 331, respectively. The highlighted block (block 320) is the block that a malevolent user is attacking using a replay attack. At step 340, the malevolent user copies the data block of interest, for example a data block used to store an account balance, along with its corresponding hash value. Here, the malevolent user copies data block 320 and its corresponding hash value 321. The copy of the data block and its corresponding hash value are stored in a separate storage area (350), such as a nonvolatile storage device or in memory. At step 360, the malevolent user performs functions that result in the data block being rewritten and a new hash value being computed and stored by the encrypted file system. For example, if the user initially had $100 in an account (e.g., for an electronic game or other account where the value is stored by the encrypted file system) and the user plays the game or uses a service that results in the balance being decremented, for example, from the $100 initial balance down to a final balance of $5, then the system will write the $5 balance to the data block resulting in modified data block 370 shown in data block depiction 365. Because the data is being stored in an encrypted file system, the writing of the modified data block will result in a new hash value corresponding to the data block and the new hash value is also stored (new hash value 371). Turning to step 380, the malevolent user now copies the original values of the data block and hash value (previously stored in storage area 350) back to the data block and hash value addresses. Because the hash value corresponds to the initial data block value, the encrypted file system overwrites the data block and the hash value. Data block and hash value depiction 390 shows the resulting data block and hash value after the malevolent user has performed the replay attack. As can be seen, the initial data block 320 has been rewritten to the encrypted file system along with the correct hash value 321 that corresponds to the initial data block value. Using the example outlined above, if the data block is used to store an account balance that was depleted, after the replay attack the account balance is back to its initial value and does not reflect the user's use of the service and depletion of the account balance. In this fashion, the malevolent user can continue using the service without ever paying for its use, other than the initial purchase that, for example, initialized the service with $100.

Figure 4:
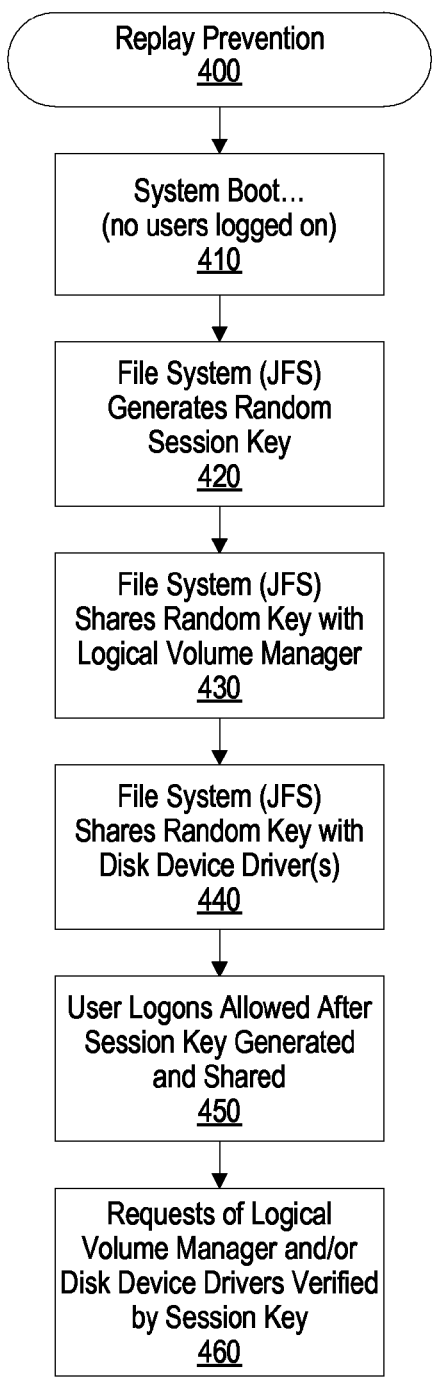
FIG. 4 is a high level flowchart of steps taken for replay attack prevention in an encrypted file system.

FIG. 4 is a high level flowchart of steps taken for replay attack prevention in an encrypted file system. Processing commences at 400 whereupon, at step 410, the computer system is booted with no users currently logged onto the system. Before any users are allowed to logon to the system, at step 420, the file system, such as the Journaled File System (or JFS) which is a 64-bit journaling filesystem created by International Business Machines (IBM), generates a random number that is used as a session key. At step 430, the file system shares the random key with the logical volume manager and, at step 440, the file system shares the session key with one or more disk device drivers. Again, steps 430 and 440 are performed before uses are allowed onto the system so that a malevolent user cannot intercept the session key and use it to thwart the replay attack prevention techniques described herein. At step 450, users are allowed to logon after the session key has been generated and shared with the logical volume manager and the disk device drivers. After the session key has been shared, at step 440, requests to and from the logical volume manager and/or the disk device drivers are verified using the session key. Collectively, the logical volume manager and the disk device drivers are referred to herein as the "drive managers."

Figure 5:
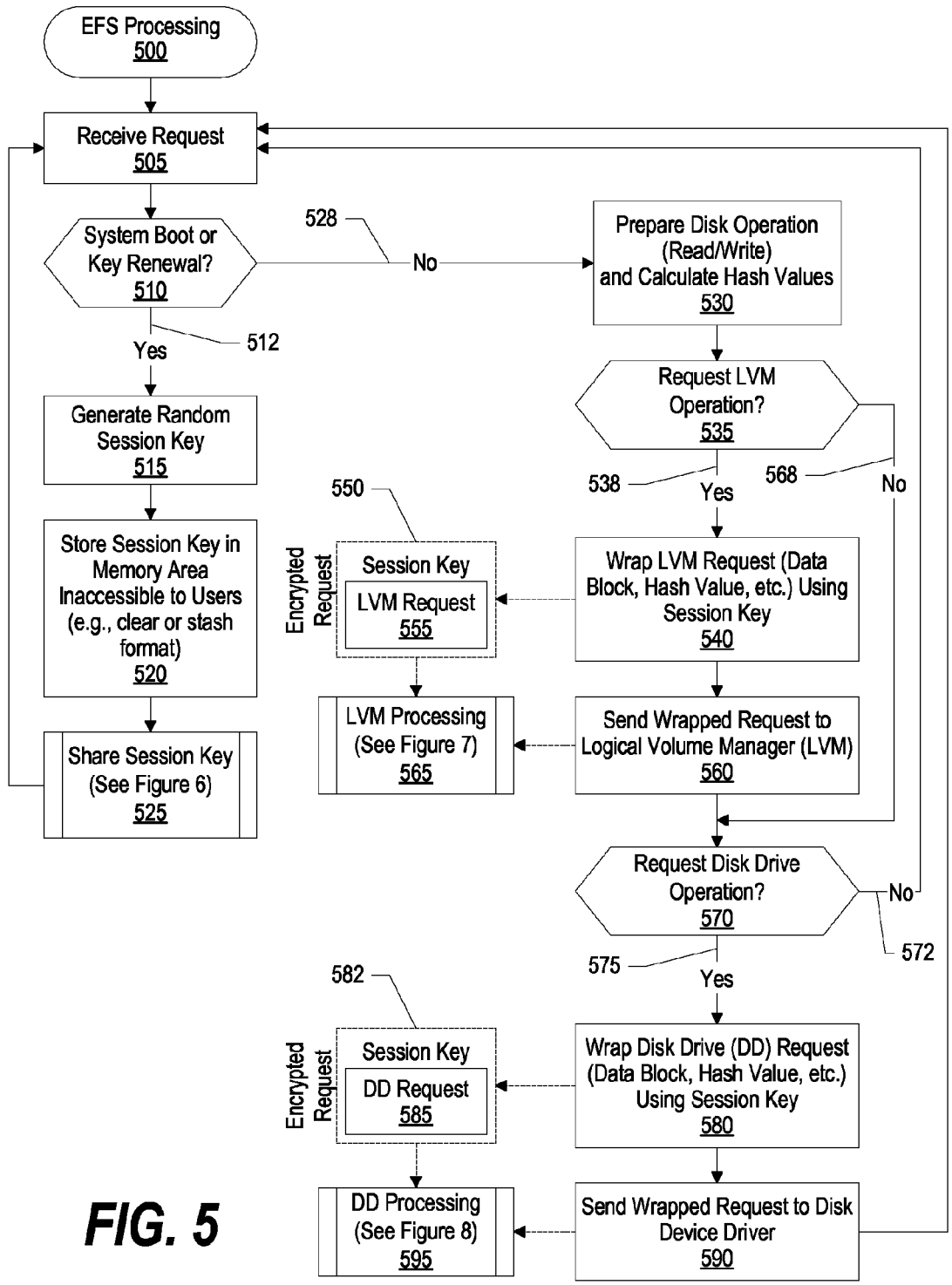
FIG. 5 is a flowchart showing steps performed by the encrypted file system process to prevent replay attacks.

FIG. 5 is a flowchart showing steps performed by the encrypted file system process to prevent replay attacks. Encrypted file system (EFS) processing commences at 500 whereupon, at step 505 a request is received. A determination is made as to whether the request is for a system boot or a key renewal (decision 510). If the request is for a system boot or key renewal, then decision 510 branches to "yes" branch 512 whereupon, at step 515, a new random number is generated and used as the session key. At step 520, the session key that was generated in step 515 is stored in a memory area that is inaccessible to users. In one embodiment, the session key is stored in clear or stash format, as known by those skilled in the art, and is therefore inaccessible to a malevolent user. At predefined process 525, the generated session key is shared with the drive managers.

Returning to decision 510, if the request is not a system or key renewal request, then decision 510 branches to "no" branch 528 to process the request. At step 530, the disk operation is prepared (e.g., a read or write request) and hash values are calculated. A determination is made as to whether a logical volume manager (LVM) operation is being requested (decision 535). If an LVM operation is being requested, then decision 535 branches to "yes" branch 538 whereupon, at step 540, the LVM request (the data block, hash value, data, etc.) are wrapped using the session key resulting in encrypted request 550. At step 560, wrapped request 550 is sent to the logical volume manager (LVM). LVM processing is depicted by predefined process 565 (see FIG. 7 and corresponding text for processing details performed by the LVM). Returning to decision 535, if the request is not a request for a LVM operation, then decision 535 branches to "no" branch 568 bypassing the LVM steps depicted in steps 540 to 565.

A determination is made as to whether the request includes a request for a disk drive (DD) operation (decision 570). If the request does not include a request for a disk drive operation, then decision 570 branches to 572, bypassing the disk drive operation steps and returning to step 505 where the next request is received. On the other hand, if the request include a request for a disk drive operation, then decision 570 branches to "yes" branch 575 whereupon, at step 580, the disk drive request (data block, hash value, data, etc.) are wrapped using the session key resulting in encrypted request 582. At step 590, wrapped request 582 is sent to the disk device driver (DD). Disk device driver (DD) processing is depicted by predefined process 595 (see FIG. 8 and corresponding text for processing details performed by the DD). After the encrypted (wrapped) request is sent to the disks device driver, processing loops back to receive and process the next request.

Figure 6:
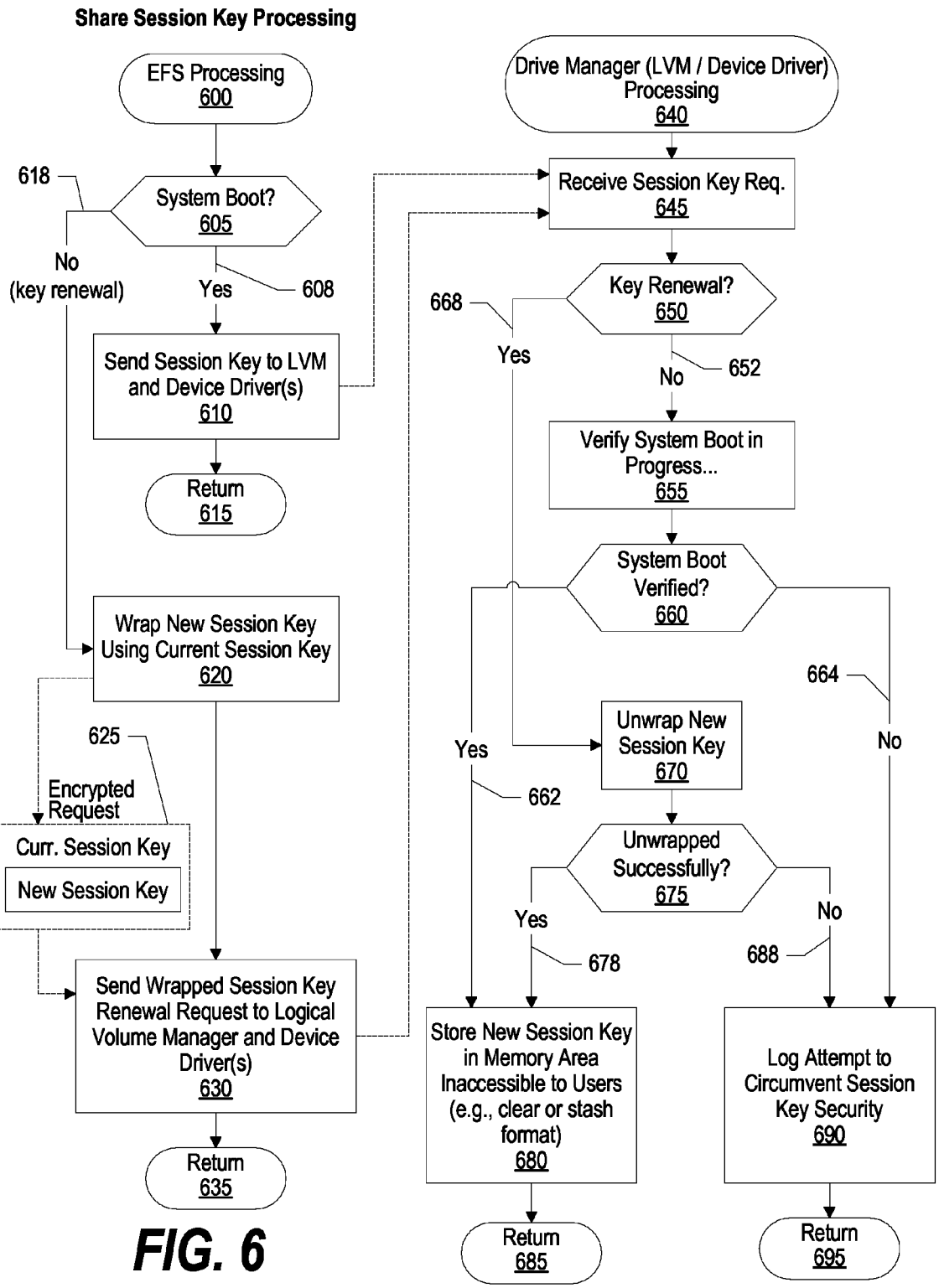
FIG. 6 is a flowchart showing steps taken to share a session key between the encrypted file system and the drive managers.

FIG. 6 is a flowchart showing steps taken to share a session key between the encrypted file system and the drive managers. Encrypted file system (EFS) processing to share a session key is shown commencing at 600. A determination is made as to whether the system is currently booting (decision 605). If the system is being booted, no users are logged onto the system and a session key is not currently being shared between the EFS and the drive managers. If the system is being booted, decision 605 branches to "yes" branch 608 whereupon, at step 610 a newly generated random number that has been generated to use as the session key is sent to the drive managers (the logical volume manager (LVM) and disk device (DD) drivers). Processing then returns to the calling process at 615 (see FIG. 5 where incoming requests are received and processed).

Returning to decision 605, if the system is not being booted, then the session key is being renewed, so decision 605 branches to "no" branch 618 in order to renew the session key. At step 620, the newly generated random number that will be used as the new session key is wrapped (encrypted) using the current session key resulting in wrapped (encrypted) request 625. At step 630, wrapped (encrypted) request 625 that includes the new session key is sent to the drive managers (the logical volume manager (LVM) and disk device (DD) drivers). Processing then returns to the calling routine (see FIG. 5 where incoming requests are received and processed).

Figure 7:
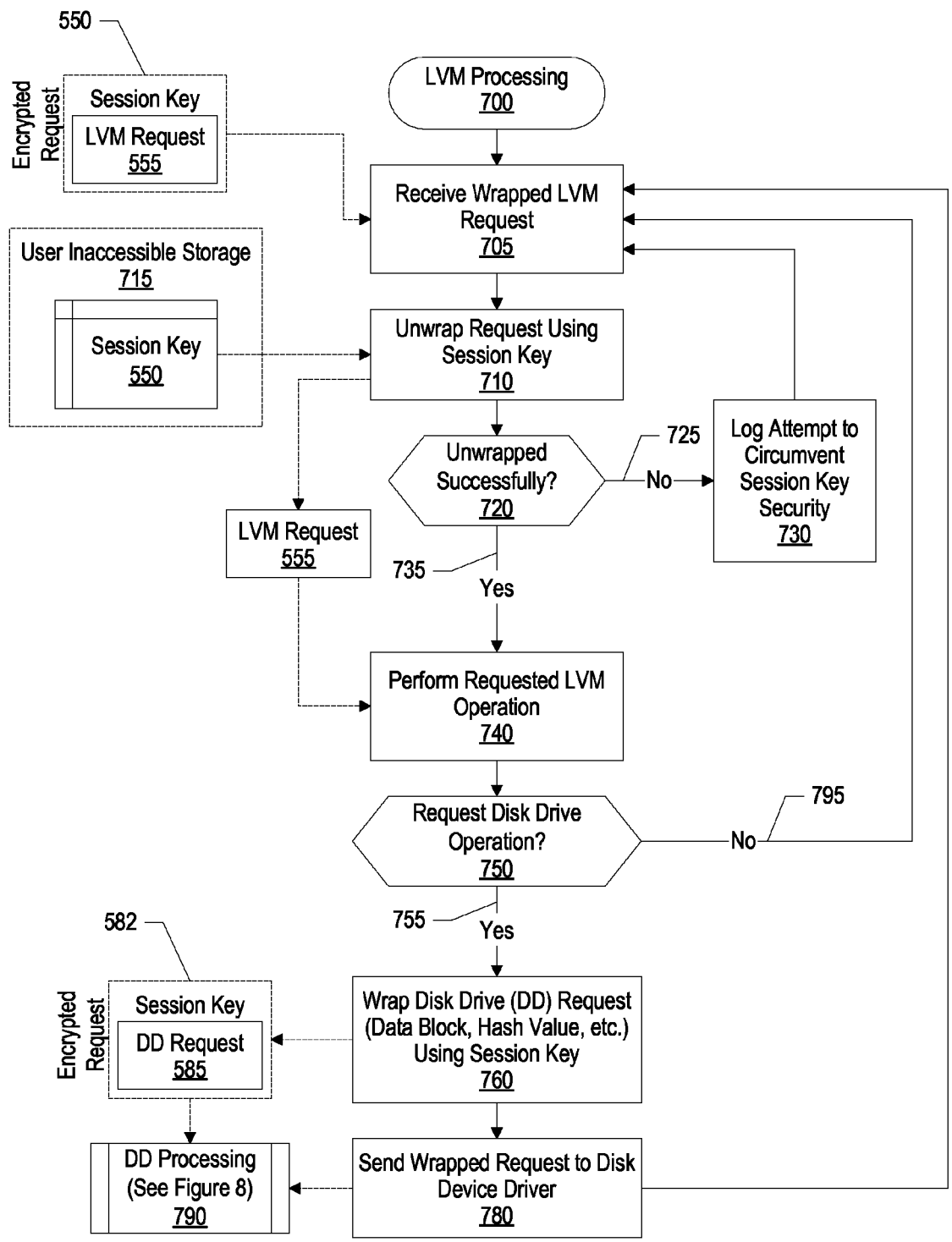
FIG. 7 is a flowchart showing steps taken by a logical volume manager in preventing replay attacks.
Figure 8:
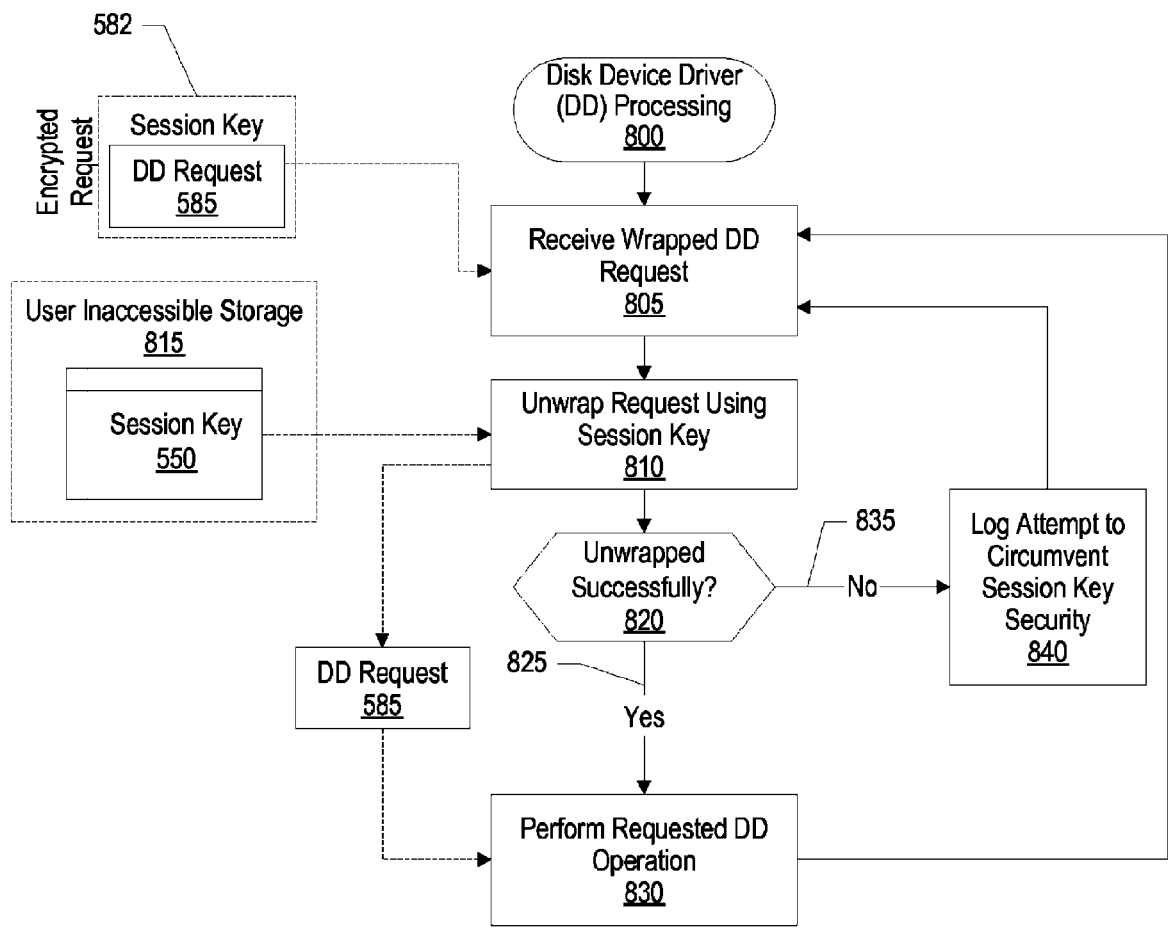
FIG. 8 is a flowchart showing steps taken by a disk device driver in preventing replay attacks.

Processing performed by the drive managers (the logical volume manager (LVM) and disk device (DD) drivers) is shown commencing at 640 whereupon, at step 645, the drive manager receives the session key request. A determination is made as to whether the session key is being renewed or is a new (initial) session key created when the system is being booted (decision 650). If the session key is not being renewed, then decision 650 branches to "no" branch 652 whereupon, at step 655, the drive manager verifies that a system boot is in progress and that no users are currently logged onto the system. A determination is made as to whether the system boot is verified and actually taking place (decision 660). If the system boot is verified, then decision 660 branches to "yes" branch 662 whereupon, at step 680, the new area is stored by the drive manager in a memory area that is inaccessible to users, such as in the clear or stash formats as known by those skilled in the art. At 685, processing returns to the calling routine (see, e.g., FIGS. 7 and 8, showing the LVM and DD, respectively, processing requests that have been encrypted using the session key). On the other hand, if the system boot is not verified, then decision 660 branches to "no" branch 664 whereupon, at step 690, an entry is written to a log indicating that an attempt was made to circumvent the session key security and at 695 processing returns to the calling routine (see, e.g., FIGS. 7 and 8) where the respective drive managers continue to process requests using the last session key that was successfully shared by the EFS.

Returning to decision 650, if the session key is being renewed, then decision 650 branches to "yes" branch 668 whereupon, at step 670, the drive manager unwraps (decrypts) the new session key using the current session key. A determination is made as to whether the new session key was decrypted successfully (decision 675). If the new session key was decrypted successfully, then decision 675 branches to "yes" branch 678 whereupon the new session key is stored in a memory area inaccessible to users and overwrites the current session key so that the new session key is now used as the current session key. At step 685, processing returns to the calling routine (see, e.g., FIGS. 7 and 8) where the newly generated session key is used as the session key to process requests to and from the EFS. Returning to decision 675, if the new session key was not successfully decrypted, then decision 6675 branches to "no" branch 688 whereupon, at step 690, an entry is written to a log indicating that an attempt was made to circumvent the session key security and, at 695, processing returns to the calling routine (see, e.g., FIGS. 7 and 8) where the respective drive managers continue to process requests using the last session key that was successfully shared by the EFS.

FIG. 7 is a flowchart showing steps taken by a logical volume manager (LVM) in preventing replay attacks. At step 705, the LVM receives wrapped (encrypted) request 550 that includes LVM request 555. At step 710, the LVM unwraps (decrypts) wrapped request 550 using session key 550 that is stored in user inaccessible storage 715. A determination is made as to whether the request is successfully unwrapped using the session key (decision 720). If the request is not successfully unwrapped, it may indicate that a malevolent user is attempting to circumvent the replay attack security and decision 720 branches to "no" branch 725 whereupon, at step 730, an entry is written to a log indicating that an attempt was made to circumvent the session key security and processing loops back to receive the next request without processing the request that was not successfully unwrapped.

On the other hand, if wrapped request 550 is successfully unwrapped, then decision 720 branches to "yes" branch 735 to process the request. At step 740 the requested logical volume manager request is processed using decrypted LVM request 555. A determination is made as to whether a disk drive operation (performed by a disk device driver) is needed (decision 750). If a disk drive operation is needed, then decision 750 branches to "yes" branch 755 whereupon, at step 760, the needed disk drive (DD) operation request is wrapped (encrypted) resulting in encrypted DD request 582. The disk drive request 585 that is encrypted includes data such as the data block, hash value, data to be written, etc. At step 780, wrapped (encrypted) request 582 is sent to the disk device driver. Disk device driver (DD) processing is depicted by predefined process 790 (see FIG. 8 and corresponding text for processing details performed by the DD). After the encrypted (wrapped) request is sent to the disks device driver, processing loops back to receive and process the next LVM request. Returning to decision 750, if the logical volume manager is not requesting a disk drive operation, then decision 750 branches to "no" branch 795 which loops back to receive and process the next LVM request.

FIG. 8 is a flowchart showing steps taken by a disk device driver in preventing replay attacks. Disk device driver (DD) processing is shown commencing at 800 whereupon, at step 805, the disk device driver receives wrapped (encrypted) request 582 that includes disk device request 585. At step 810, the disk device driver attempts to unwrap (decrypt) encrypted request 582 using session key that is stored in user inaccessible storage 815.

A determination is made as to whether encrypted request 582 was successfully decrypted (decision 820). If the request was successfully unwrapped, then decision 820 branches to "yes" branch 825 whereupon, at step 830, the disk device driver performs the requested disk device request (DD request 585). On the other hand, if the request was not successfully decrypted, then decision 820 branches to "no" branch 835 whereupon, at step 840 and entry is written to a log indicating that an attempt was made to circumvent the session key security and processing loops back to receive the next DD request without processing the request that was not successfully unwrapped.

Figure 9:
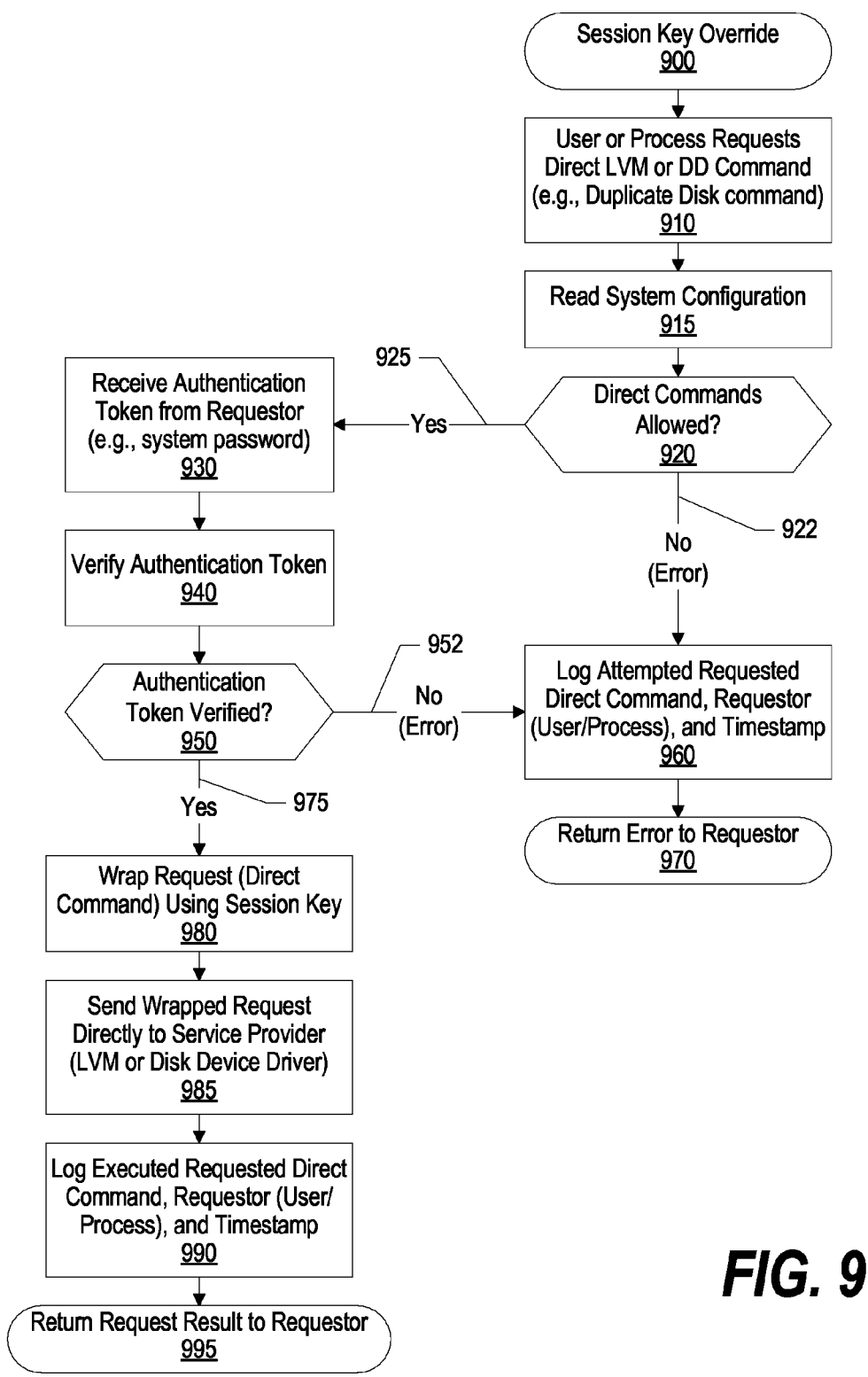
FIG. 9 is a flowchart showing steps taken to override the use of the session key for legitimate purposes.

FIG. 9 is a flowchart showing steps taken to override the use of the session key for legitimate purposes. Sometimes it may be advantageous to allow a user or process direct access to LVM or DD commands. The steps shown in FIG. 9 allow a user or process to use the session key for legitimate purposes, such as request to duplicate a disk. Processing commences at 900 whereupon, at step 910, the user or process requests use of a direct LVM or DD command without going through the EFS processing shown in FIG. 5. At step 915 system configuration data is read and a determination is made as to whether direct commands are allowed on this system (decision 920). If direct commands are not allowed, then decision 920 branches to "no" branch 922 whereupon, at step 960, an entry is written to a log indicating that the requestor attempted to execute the direct command along with the requestor's identifier (user id, process name, etc.) and the current timestamp. Processing then returns an error to the requestor at 970.

On the other hand, if direct commands are allowed, then decision 920 branches to "yes" branch 925 whereupon, at step 930, an authentication token is received from the requesting user or process, such as a system password. At step 940, the authentication token is verified. A determination is made as to whether the authentication token provided by the user or process was successfully authenticated (decision 950).

If the authentication token is not successfully authenticated, then decision 950 branches to "no" branch 952 whereupon, at step 960 an entry is written to a log indicating that a request was made to execute a direct command and the requester (user id, process name, etc.) is written to the log entry along with the timestamp. An error is then returned to the requestor at 970.

On the other hand, if the authentication token is successfully verified, then decision 950 branches to "yes" branch 975 whereupon, at step 980, the command being requested by the user or process is wrapped (encrypted) by the EFS using the session key. At step 985, the wrapped request is sent directly to the drive manager (LVM or DD) for processing. At step 990, an entry is written to a log in a memory area that can only be read by users and not overwritten or deleted (R/O access only). This entry includes the direct command that was executed, the requestor (user id, process, etc.) and the timestamp. The result of the LVM or DD operation is then returned to the requester at 995. In addition, additional logic can be implemented that restricts the direct commands that the requester is allowed to request depending on the system configuration, the user or processes authority, etc.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method to prevent replay attacks in an encrypted file system (EFS), the method comprising:
   generating a session key;
   providing the session key to a plurality of drive managers and an encrypted file system process;
   determining, by each of the drive managers, if the session key is an updated session key that is part of a key renewal request;
   in response to determining that the session key is an updated session key that is part of a key renewal request, performing, by the drive managers, the following:
      decrypting, at each of the drive managers, the updated session key; and
      after the decrypting, replacing a current session key with the updated session key at each of the drive managers;
   in response to determining that the session key is not an updated session key that is part of a key renewal request, storing, at the drive managers, the session key in further response to determining that user access to a computer system that is utilizing the encrypted file system is currently inhibited;
   in response to determining that the session key is not an updated session key that is part of a key renewal request, and that user access to the computer system that is utilizing the encrypted file system is not currently inhibited, logging an attempt to circumvent session key security;
   receiving a drive request at the encrypted file system process;
   encrypting the drive request using the generated session key provided to the encrypted file system process;
   sending the encrypted drive request to a selected one of the drive managers, wherein the selected drive manager performs steps of:
      attempting to decrypt the drive request using the session key provided to the selected drive manager; and
      performing the drive request in response to the decrypt attempt successfully decrypting the encrypted drive request, wherein the drive request is not performed in response to an unsuccessful decryption attempt.

2. The method of claim 1 further comprising:
inhibiting user logons until after the session key has been generated and provided to the drive managers and the encrypted file system process.

3. The method of claim 1 further comprising:
generating, by the encrypted file system, the updated session key after a period of time has expired since the generation of the current session key;
encrypting, by the encrypted file system, the updated session key using the current session key;
sending the encrypted updated session key from the encrypted file system to the drive managers, as part of the key renewal request.

4. The method of claim 1, wherein the selected drive manager is a logical volume manager, and the method further comprises:
after performing the drive request by the logical volume manager, requesting a disk drive operation by the logical volume manager, the requesting including:
encrypting the disk drive operation request using the session key; and
sending the encrypted disk drive operation request from the logical volume manager to a disk device driver.

5. The method of claim 4 further comprising:
receiving at the disk device driver, the encrypted disk drive operation request;
decrypting, by the disk device driver, the encrypted disk drive operation request; and
performing, by the disk device driver, the decrypted disk drive operation request.

6. The method of claim 1 further comprising:
calculating, by the encrypted file system process, a hash value corresponding to the drive request, wherein the drive request is a write request and includes data to be written to a nonvolatile storage device;
including the hash value and the data to be written in the drive request;
receiving, at the selected drive manager, the encrypted drive request that includes the hash value and the data to be written; and
writing, by the selected drive manager, the hash value and the data to be written to the nonvolatile storage device.

7. The method of claim 1 wherein the drive request is a read request and wherein the method further comprises:
reading, by the selected drive manager, data from a nonvolatile storage device and a stored hash value that corresponds to the data;
returning the data and the stored hash value to the encrypted file system process;
calculating, by the encrypted file system process, a hash value corresponding to data,
returning the data in response to the calculated hash value being equal to the stored hash value; and
causing an error in response to the calculated hash value being different than the stored hash value.

8. A information handling system comprising:
one or more processors;
a memory accessible by at least one of the processors;
a nonvolatile storage area accessible by at least one of the processors;
a set of instructions stored in the memory and executed by at least one of the processors in order to perform actions of:
generating a session key;
providing the session key to a plurality of drive managers and an encrypted file system process;
determining, by each of the drive managers, if the session key is an updated session key that is part of a key renewal request;
in response to determining that the session key is an updated session key that is part of a key renewal request, perform, by the drive managers, the following:
decrypting, at each of the drive managers, the updated session key; and
after the decrypting, replacing a current session key with the updated session key at each of the drive managers;
in response to determining that the session key is not an updated session key that is part of a key renewal request, storing, at the drive managers, the session key in further response to determining that user access to a computer system that is utilizing the encrypted file system is currently inhibited;
in response to determining that the session key is not an updated session key that is part of a key renewal request, and that user access to the computer system that is utilizing the encrypted file system is not currently inhibited, logging an attempt to circumvent session key security;
receiving a drive request at the encrypted file system process;
encrypting the drive request using the generated session key provided to the encrypted file system process;
sending the encrypted drive request to a selected one of the drive managers, wherein the selected drive manager performs steps of:
attempting to decrypt the drive request using the session key provided to the selected drive manager; and
performing the drive request in response to the decrypt attempt successfully decrypting the encrypted drive request, wherein the drive request is not performed in response to an unsuccessful decryption attempt.

9. The information handling system of claim 8 wherein the set of instructions, when executed, cause at least one of the processors to perform further actions comprising:
inhibiting user logons until after the session key has been generated and provided to the drive managers and the encrypted file system process;
logging on one or more users to the computer system that is utilizing the encrypted file system after the session key has been generated and provided to the drive managers and the encrypted file system process;
generating, by the encrypted file system, an updated session key after a period of time has expired since the generation of the current session key;
encrypting, by the encrypted file system, the updated session key using the current session key;
sending the encrypted updated session key from the encrypted file system to the drive managers, as part of the key renewal request.

10. The information handling system of claim 8 wherein the selected drive manager is a logical volume manager and wherein the set of instructions, when executed, cause at least one of the processors to perform further actions comprising:
after performing the drive request by the logical volume manager, requesting a disk drive operation by the logical volume manager, the requesting including:
encrypting the disk drive operation request using the session key; and
sending the encrypted disk drive operation request from the logical volume manager to a disk device driver;

receiving at the disk device driver, the encrypted disk drive operation request;

decrypting, by the disk device driver, the encrypted disk drive operation request; and performing, by the disk device driver, the decrypted disk drive operation request.

11. The information handling system of claim 8 wherein the set of instructions, when executed, cause at least one of the processors to perform further actions comprising:

calculating, by the encrypted file system process, a hash value corresponding to the drive request, wherein the drive request is a write request and includes data to be written to a nonvolatile storage device;

including the hash value and the data to be written in the drive request;

receiving, at the selected drive manager, the encrypted drive request that includes the hash value and the data to be written; and writing, by the selected drive manager, the hash value and the data to be written to the nonvolatile storage device.

12. The information handling system of claim 8 wherein the drive request is a read request and wherein the set of instructions, when executed, cause at least one of the processors to perform further actions comprising:

reading, by the selected drive manager, data from a non-volatile storage device and a stored hash value that corresponds to the data;

returning the data and the stored hash value to the encrypted file system process;

calculating, by the encrypted file system process, a hash value corresponding to data, returning the data in response to the calculated hash value being equal to the stored hash value; and causing an error in response to the calculated hash value being different than the stored hash value.

13. A computer program product stored in a computer readable memory device, comprising functional descriptive material that, when executed by an information handling system, causes the information handling system to perform actions that include:

generating a session key;

providing the session key to a plurality of drive managers and an encrypted file system process;

determining, by each of the drive managers, if the session key is an updated session key that is part of a key renewal request;

in response to determining that the session key is an updated session key that is part of a key renewal request, performing, by the drive managers, the following:
  decrypting, at each of the drive managers, the updated session key; and
  after the decrypting, replacing a current session key with the updated session key at each of the drive managers;

in response to determining that the session key is not an updated session key that is part of a key renewal request, storing, at the drive managers, the session key in further response to determining that user access to a computer system that is utilizing the encrypted file system is currently inhibited;

in response to determining that the session key is not an updated session key that is part of a key renewal request, and that user access to the computer system that is utilizing the encrypted file system is not currently inhibited, logging an attempt to circumvent session key security;

receiving a drive request at the encrypted file system process;

encrypting the drive request using the generated session key provided to the encrypted file system process;

sending the encrypted drive request to a selected one of the drive managers, wherein the selected drive manager performs steps of:
  attempting to decrypt the drive request using the session key provided to the selected drive manager; and
  performing the drive request in response to the decrypt attempt successfully decrypting the encrypted drive request, wherein the drive request is not performed in response to an unsuccessful decryption attempt.

14. The computer program product of claim 13 further comprising functional descriptive material that causes the data processing system to perform additional actions that include:

inhibiting user logons until after the session key has been generated and provided to the drive managers and the encrypted file system process;

logging on one or more users to a computer system that is utilizing the encrypted file system after the session key has been generated and provided to the drive managers and the encrypted file system process;

generating, by the encrypted file system, an updated session key after a period of time has expired since the generation of the current session key;

encrypting, by the encrypted file system, the updated session key using the current session key;

sending the encrypted updated session key from the encrypted file system to the drive managers, as part of the key renewal request.

15. The computer program product of claim 13 wherein the selected drive manager is a logical volume manager and further comprising functional descriptive material that causes the data processing system to perform additional actions that include:

after performing the drive request by the logical volume manager, requesting a disk drive operation by the logical volume manager, the requesting including:
  encrypting the disk drive operation request using the session key; and
  sending the encrypted disk drive operation request from the logical volume manager to a disk device driver;

receiving at the disk device driver, the encrypted disk drive operation request;

decrypting, by the disk device driver, the encrypted disk drive operation request; and performing, by the disk device driver, the decrypted disk drive operation request.

16. The computer program product of claim 13 further comprising functional descriptive material that causes the data processing system to perform additional actions that include:

reading, by the selected drive manager, data from a non-volatile storage device and a stored hash value that corresponds to the data;

returning the data and the stored hash value to the encrypted file system process;

calculating, by the encrypted file system process, a hash value corresponding to data, returning the data in response to the calculated hash value being equal to the stored hash value; and causing an error in response to the calculated hash value being different than the stored hash value.

* * * * *